(12) United States Patent
Greenwald et al.

(10) Patent No.: US 8,180,480 B2
(45) Date of Patent: May 15, 2012

(54) TOOL BIT MONITORING FOR ON-VEHICLE BRAKE LATHE

(75) Inventors: Christopher L. Greenwald, Waban, MA (US); Martin C. Poppe, Burlington, VT (US)

(73) Assignee: Pro-Cut Licensing Company, LLC, West Lebanon, NH (US)

(*) Notice: Subject to any disclaimer, the term of this patent is extended or adjusted under 35 U.S.C. 154(b) by 307 days.

(21) Appl. No.: 12/639,040

(22) Filed: Dec. 16, 2009

(65) Prior Publication Data

US 2011/0144794 A1 Jun. 16, 2011

(51) Int. Cl.
*G06F 19/00* (2006.01)

(52) U.S. Cl. ............ 700/174; 700/28; 700/164; 82/112; 82/118

(58) Field of Classification Search .................. 700/28, 700/160, 164, 168, 174, 195; 83/62; 82/1.11, 82/112, 118
See application file for complete search history.

(56) References Cited

U.S. PATENT DOCUMENTS

| | | | |
|---|---|---|---|
| 6,363,821 B1 * | 4/2002 | Greenwald et al. | 82/1.11 |
| 6,729,212 B2 | 5/2004 | Muller | |
| 7,681,478 B2 * | 3/2010 | Gerdes et al. | 82/1.11 |
| 7,861,625 B2 * | 1/2011 | Greenwald et al. | 82/112 |
| 7,896,613 B2 * | 3/2011 | Xiong | 416/1 |
| 2005/0016338 A1 | 1/2005 | Gerdes et al. | |
| 2008/0121076 A1 * | 5/2008 | Gerdes et al. | 82/1.11 |
| 2009/0107309 A1 * | 4/2009 | Greenwald et al. | 82/118 |
| 2011/0226105 A1 * | 9/2011 | Butler et al. | 83/62 |

* cited by examiner

*Primary Examiner* — Albert Decady
*Assistant Examiner* — Douglas Lee
(74) *Attorney, Agent, or Firm* — Michael J. Weins; Jeffrey E. Semprebon

(57) ABSTRACT

A system and method for monitoring the contact of tool bits of a lathe with surfaces of a brake disk being machined employs a vibration sensor coupled to the lathe. Signals from the vibration sensor are processed as time-averaged segments that can be grouped within time intervals; a microprocessor employs a qualifying routine to compare the signal level to a background noise threshold value and indicates as "failed" those time periods where the average signal level is not above the background noise threshold. An accumulator records the indications over a number of intervals and compares the result to a standard to make a determination of whether the lathe is likely actively cutting the disk surfaces. To isolate intermittent, high-intensity noises, a consistency routine can check further to see whether individual segments within an interval fall within a range based on the average signal level for that interval.

22 Claims, 8 Drawing Sheets

TOOL BIT MONITORING FOR ON-VEHICLE BRAKE LATHE

FIELD OF THE INVENTION

The present invention relates to brake lathes that are employed to resurface brake disks, and particularly to an automated system for monitoring the machining process.

BACKGROUND

When operating an on-vehicle disk brake lathe, it is beneficial to be able to monitor the cutting status to establish the likelihood of a continuous cut being performed. To track the cutting status of a brake lathe during the turning operation, the lathe should be provided with a system for making a determination of when tool bits of the lathe have begun actively cutting surfaces of a brake disk to machine them, as well as a determination of when such cutting, once initiated, has ceased.

Past systems for monitoring the contact of tool bits of a lathe with the surfaces of a brake disk during a turning operation have employed contact sensors to determine when the tool bits of the lathe are in contact with the disk surfaces, in order to facilitate setting an appropriate depth of cut, such as taught in U.S. Pat. No. 6,363,821. This patent teaches that such contact sensors can include electrical continuity detectors, vibration sensors, and strain sensors. Electrical conductivity sensors and vibration sensors are also taught in U.S. Publication 2005/0016338 for determining when the tool bits of a lathe are in contact with disk surfaces.

The use of an electrical conductivity sensor to determine when a cutting operation has been completed is taught in U.S. Pat. No. 6,729,212, which teaches an iterative machining technique where machining is repeated with increasing depth of cut until such time as the electrical contact between the tool bit and the disk surface is determined to be substantially constant throughout the cut.

SUMMARY

The present invention provides a monitoring system for mechanically tracking the nature of the contact of tool bits of a brake lathe with surfaces of a brake disk during the turning operation, in order to provide notice that the lathe has begun actively cutting the disk surfaces, as well as monitoring the character of the progress and providing notice when such cutting has been completed. The monitoring of the character of the cutting is done in a stepwise manner where the monitoring is done on a interval-by-interval basis, the duration of the time intervals T is chosen to avoid artifacts associated with machining (too small a time can result in false indications of machining due to tool bits being advanced into the surfaces as cutting begins, and too long a time can result in significant changes in the signal level during the interval due to drift.) Previous attempts to monitor cutting have relied on instantaneous monitoring techniques as taught in the prior art. Although U.S. publication 2005/0016338 suggests that continuous monitoring might be viewable by an operator, the system of this publication would not provide for the monitoring to be automated. Furthermore, the electrical conductivity technique utilized is limited, since it introduces complications due to the difficulty in isolating the conductive path. Finally, even though this publication suggests that contact monitoring could be done by either an electrical conductivity sensor or a vibration sensor, it teaches instantaneous monitoring and thus would be subject to false indications due to noise, intermittent contact due to notches, and similar problems, making such a system unreliable.

The system of the current application is a microprocessor-based system and employs a vibration sensor coupled to a frame of the brake lathe. While all the components of the lathe should be rigidly locked with respect to each other when making a cut, it is preferred to mount the vibration sensor to the frame to provide ample space to accommodate the sensor and to reduce the need to provide a connection across components that are movable when the lathe is adjusted in preparation to making the cut. The use of a vibration sensor eliminates the problems associated with providing an isolated conductive path between the tool bits and the disk being machined as would be required for electrical conductivity monitoring. By coupling the vibration sensor to the frame of the lathe, the effect of airborne shop noise can be reduced, such noise being generated by other machinery in the area which might be readily picked up by a microphone or by high-volume white noise, such as can be caused by compressed air tools. The vibration sensor is coupled to the frame of the lathe so as to generate a signal responsive to vibrations that the lathe experiences; these vibrations, in part, are due to the cutting of the brake disk by the tool bits of the lathe.

A microphone can be used as part of the vibration sensor. When such is employed, the microphone is held in a cavity of a housing that is coupled to the lathe frame. Employing a microphone as part of the vibration sensor provides a sensor with a relatively non-directional response.

The microprocessor is provided with an input/output interface that allows it to communicate with other elements of the system, some of which are provided as software. This software can be loaded through the input/output interface. The interface also provides for the introduction of various parameters which may depend on details of the lathe configuration and/or the environment in which the lathe operates.

A signal processor is employed to incrementally convert the signals from the vibration sensor to a formatted time-averaged incremental signal. This formatted time-averaged signal is then passed through a data pre-processor. The pre-processor in turn, for a time interval T having n increments, collects the signals and provides a series of formatted segments which can be read by the microprocessor and stored in an associated addressable memory. The length of the time interval T and the number of segments n are values provided to the system and can be adjusted according to the lathe that is being monitored as discussed earlier. It should be noted that the signal processor and the pre-processor can be an integral unit.

In general, it has been found that a time interval T between about one and four seconds is effective. The length of the interval should be chosen in view of the typical time of noise generated when an operator advances one of the tool bits to set an appropriate depth of cut, this time in turn depending, in part, on the rotational speed of the lathe. The length of the interval may also depend, in part, on the details of how the signals are subsequently processed. The time interval of the n incremental segments is preferably set such that the duration of each segment is at least roughly the same as the duration of a typical noise event as experienced by the vibration sensor, which is dependent on the sensor type, its coupling to the lathe, and the configuration of the lathe itself.

The system includes one or more routines for the analysis of the vibration signals to isolate those signals that are caused by interaction between a brake disk and a tool bit that is cutting the disk surface. These routines allow the system to distinguish vibration signals resulting from intermittent high-intensity noise and low-intensity background noise from signals resulting from cutting. The system of the present invention benefits from monitoring the vibration of the lathe frame, in that it is relatively insensitive to airborne shop noise.

An index of the level of consistent low-intensity background noise, including machine-generated noise, may be provided to the system via the input/output interface. This background noise threshold can be provided as a default value or can be provided by qualifying the machine with respect to the noise resulting from the operation of the machine when cutting is not occurring. In the latter case, the signals from the vibration sensor can be monitored at a time when the lathe is known to not be actively cutting to determine an average background noise level, which is then multiplied by a scaling factor Sf that is provided through the input/output interface to provide a background noise threshold value. This approach can be helpful in cases where the individual lathe is particularly noisy, such as when worn or operated in an especially noisy environment. The scale factor Sf is typically slightly above unity, and is preferably chosen to be between about 1.2 and 1.5. In either case, the background noise threshold should be set such that the vibration signal, if consistent and above this level, is likely the result of vibrations generated from cutting.

The incremented formatted signal for the time interval T can be analyzed for sufficiently high amplitude in two alternate ways. In the first instance, the overall average a of the interval is compared to the background noise threshold. If the average a is less than the scaled value, then it is presumed that cutting is not occurring, at least in a continuous manner, and an indicator is provided for the entire interval that cutting is not occurring, and such indicator stored for reporting. An alternate approach is to compare each segment individually against the background noise threshold and store the indicators for both the passed and the failed segments.

In either case, those segments not indicated as being the result of consistent low-intensity machine noise can be further analyzed by a signal consistency routine to help distinguish vibrations that are likely to be due to cutting from vibrations due to incidental high-intensity noise such as the lathe being bumped or struck with a tool. This can be done by checking to see whether the values for the segments fall within a control range R based on the average a of the interval T. In order to establish R for such an evaluation, a maximum level M consistent with vibrations resulting from cutting and not incidental intermittent very high intensity machine noise is established by scaling the average value a for the time interval T by an appropriate function; in a simple case, the function can be a simple scaling operation, where the average a is multiplied by an upper range scale factor S which can be adjusted through the input/output interface. A preferred range for S is typically between 1.25 and 1.35. However, an appropriate width for the range is, in part, dependent on the length of the interval; since the average signal level tends to change as the cutting operation progresses, a longer interval time may require a larger range to accommodate the gradual change of the average signal level over the course of the interval. To accommodate very quiet cuts, where the average signal level a is likely to be small relative to the variation in level between the segments, it may be beneficial to also include an offset value in addition to the scaling factor to assure that the maximum level M is separated from the average a by a sufficient amount to accommodate typical variations in segment signal levels during such quiet cuts. This offset value can be in the range of about 70-90% of the typical average signal level for an especially quiet cut.

Similarly, a minimum level m consistent with vibrations resulting from cutting and not machine noise is established by scaling the average value a for the time interval T by an appropriate function, such as multiplying by a lower range scale factor s which can be provided through the input/output interface, and again applying an appropriate offset value to reduce the lower limit of the range R. The value m assists in providing a lower limit when the average is suppressed by a few particularly low values. A preferred range for s is typically between 0.65 and 0.75; again, an appropriate limit for the range depends, in part, on the length of the time interval. To accommodate very quiet cuts, where the average signal level a is likely to be small relative to the variation in level between the segments, it may be beneficial to also include an offset value in addition to the scaling factor to assure that the minimum level m is separated from the average a by a sufficient amount to accommodate typical variations in segment signal levels during such quiet cuts. This offset value can again be in the range of about 70-90% of the typical average signal level for an especially quiet cut.

If the time-averaged value for a particular segment falls within the bracketed range R (M, m) of the average a, the value for that segment is reported as indicating a cut ("pass"). If outside the range, then it is reported as not indicating a cut ("fail"). While the separations of the values of M and m from the average need not be the same, analysis of the segments can be simplified if the separations are the same, as only the magnitude of the difference of the signal level for the segment from the average a for the interval need be compared to see whether the signal level falls within the range.

Independent of the details of how the pass/fail signals are provided, they are processed by an appropriate weighting function that converts these signals to a format compatible with an accumulator which maintains a tally of the "pass" and "fail" indications. In this manner, values for all the segments in the interval are provided to the accumulator in a format suitable for tallying thereby.

One particularly effective accumulator is an algebraic integer register that will sum the content introduced therein. If such is used and if a +1 is used to indicate cut ("pass") and a −1 for a failure to cut ("fail") for each of the segments, then this will produce a running index that, when bracketed by a range of possible values to prevent saturation, indicates a likelihood of cutting occurring when the value of the index maintained in the register is above a specified minimum.

The accumulator can be periodically queried by an accumulator evaluator that evaluates whether the content of the accumulator indicates that active cutting of the brake disk is occurring. This querying should not be done until sufficient time has passed to assure that the counter has had an opportunity to obtain a representative value indicating continuous cutting. Typically, the accumulator is configured such that a small number of intervals during which cutting is indicated must pass before a determination of cutting is made by the accumulator evaluator.

The present invention also provides a method for monitoring a brake lathe when the lathe is operating in a noisy environment in order to make a determination of whether time-dependent vibration signals generated by a sensor that is coupled to the lathe are indicative of the lathe actively cutting or not actively cutting a brake disk. The vibration signals are processed so as to be formatted into indexed time-averaged segments that fall within a time interval. The durations of the individual segments and time intervals can be selected in the same manner as discussed above with regard to the system.

A threshold value for the environmental noise is established; as discussed above with regard to the system, this value could be a set value appropriate for the particular type of lathe employed, or could be calibrated to reflect the particular operating conditions actually encountered when practicing the method. In either case, the signal level for the segments is compared against the threshold value of the environment noise; a "fail" indication is provided for those segments when the signal level is not above the threshold value, and "pass" indication provided when the signal level is above the threshold value. As with the system, such comparison can be done either by individual segments, or the signal levels for all segments within the time interval currently being analyzed can be averaged and the resulting average compared; in this latter case, the "fail" or "pass" indication is provided for all segments within the interval.

All the segments are compared, the resulting "pass" and "fail" indications are recorded in a cumulative manner, and the result is evaluated by comparing the cumulative "pass" and "fail" indications to a prescribed standard. The cumulative addition can be done in a manner similar to those schemes described above for the system. If the cumulative indications include a sufficient number of "pass" indications to meet the standard, then such is evaluated as indicating that the lathe is most likely actively cutting the brake disk, and an appropriate indication of such is provided. If the standard is not met, then an indication is provided that the lathe is most likely not actively cutting the disk surfaces.

While comparing the time-averaged signal levels to a threshold value and subsequently evaluating the results of the comparison in a cumulative manner can provide a significant advantage over the use of instantaneous monitoring techniques, such a method may still be susceptible to false indications of cutting due to intermittent, high-amplitude noise bursts. To avoid such false indications, the method can include additional steps to refine the analysis of those time-averaged segments for which an indication of "pass" has been provided by the comparison to the threshold noise value. When such refinement is done, an average signal level a for the entire time interval is calculated, and a scaling factor S is applied to the resulting average signal level a to obtain a separation therefrom that defines a control range R. The segments for which a "pass" indication has been provided are then individually compared to the control range R prior to the step of cumulatively adding the indications. The indication of "pass" is maintained for those segments where the signal level for the segment falls within the control range R, and the indication is changed to "fail" for those segments where the signal level falls outside the control range R.

DETAILED DESCRIPTION

Figure 1:
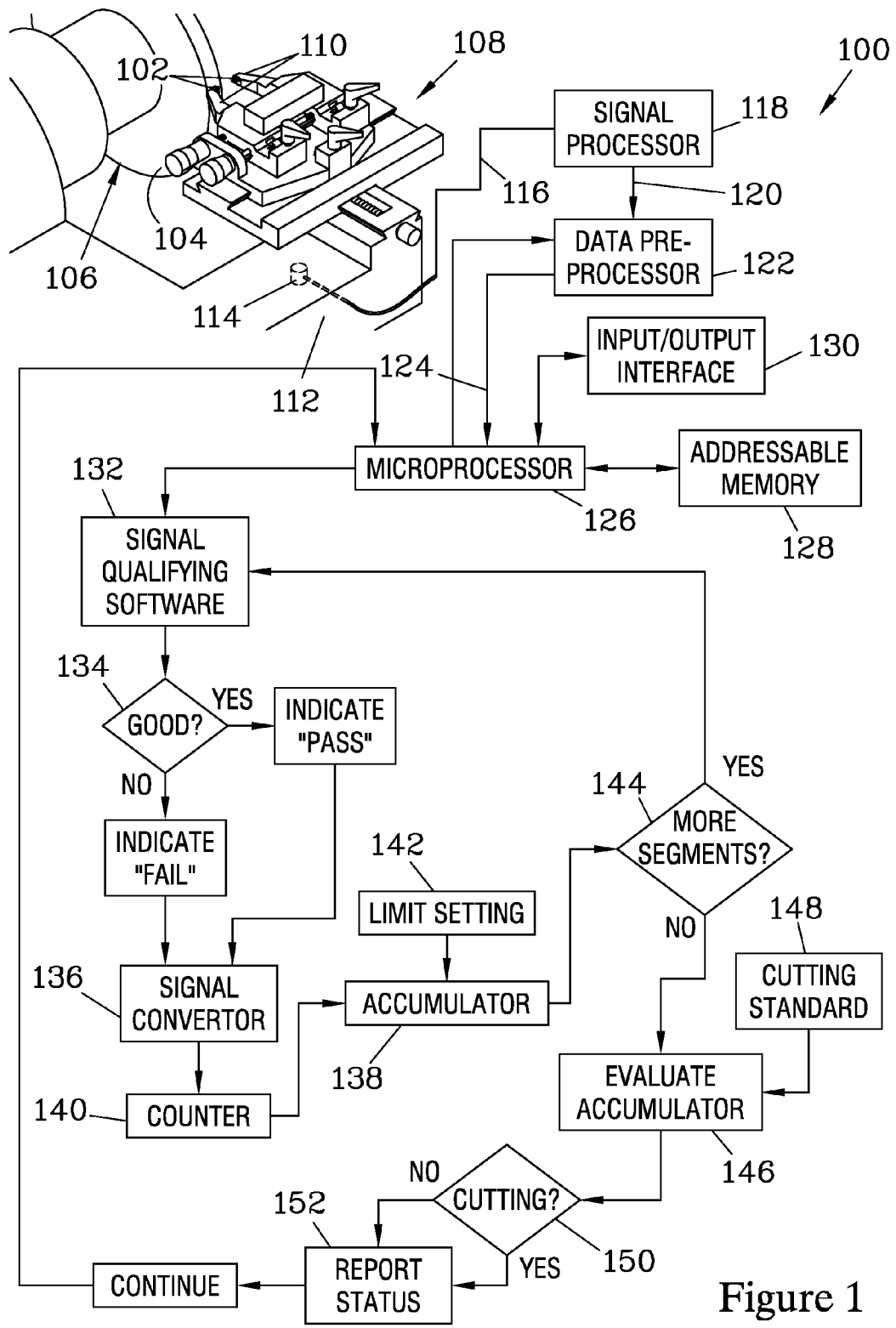
FIG. 1 is a schematic representation of a monitoring system for determining the cutting status of tool bits as they traverse the surfaces of a brake disk. The monitoring system analyzes vibration signals that are generated by a sensor in a time-integrated manner to assess the cutting status of the lathe. The vibration signals are monitored over a time interval T that has n incremental segments, and the signal level during an interval can be compared on an increment by increment basis to a background noise threshold to see whether the signal level is sufficiently high as to be likely due to cutting rather than background machine noise. The result of the comparison is appropriately reported to an accumulator, and an evaluation is made as to whether the content of the accumulator meets a prescribed standard for indicating that cutting is occurring. The standard should be set such that a number of intervals must pass before an indication of cutting is made.

FIG. 1 is a schematic diagram of a system 100 for tracking the contact of tool bits 102 with pad-engaging disk surfaces 104 of a brake disk 106. The system 100 is designed to track a time-averaged signal over several segments thus, in essence, tracking a piecewise integrated signal. In this embodiment, the signals are adjusted so as to minimize the effect of background noise. For the system 100, the tool bits 102 are part of an on-vehicle disk brake lathe 108 and are supported by tool bit arms 110 which in turn are adjustably mounted with respect to a frame 112 of the on-vehicle disk brake lathe 108.

The system 100 has a vibration sensor 114 which is coupled to the frame 112; one vibration sensor which could be employed is discussed below with regard to FIGS. 5-7. The vibration sensor 114 generates a vibration signal 116 that is responsive to the vibrations experienced by the frame 112, which in part are generated by the engagement of the tool bits 102 with the disk surfaces 104. The remainder of the signal is the result from "noise" such as operating vibrations of the lathe itself, incidental vibrations such as engaging gears, impacts to the lathe and/or the vehicle, etc. A signal processor 118 processes the vibration signal 116 to provide an incremental time-averaged formatted signal 120 which in turn is operated on by a data pre-processor 122. The data pre-processor 122 in turn collects the incremental time averaged formatted signals for a time interval T to provide time-averaged segments 124 that are indexed by time. It should be pointed out that the signal processor 118 and the data pre-processor 122 can be a single unit. The duration of the increments of the incremental time averaged signal should be adjusted by the data pre-processor 122 such that duration of the formatted signal segments 124 is selected such that each segment has a duration that is consistent with the decay time for an impact load experienced by the lathe 108, such that a typical impact, as sensed by the vibration sensor 114, has time to decay within the duration of a segment 124. Setting the duration of the segments 124 in this manner should allow the segments 124 to collectively provide a representative indication of the vibration levels experienced by the lathe 108 over time as sensed by the vibration sensor 114. The appropriate duration time for each segment 124 is typically dependent on the sensor type, its coupling to the lathe, and the configuration of the lathe itself.

The system 100 employs a microprocessor 126 having an associated addressable memory 128, the microprocessor 126 providing instructions to the data pre-processor 122 according to settings provided through an input/output interface 130 to provide formatted signals 124 that are suitable to be stored in the addressable memory 128 by the microprocessor 126 and to be operated on by the remaining element of the system 100.

The formatted signal segments 124 that are stored in the memory 128 are processed in this embodiment by signal qualifying software 132 which compares the signal levels for the segments against a predetermined background noise threshold value to determine whether the signal levels are above the threshold. The appropriate background noise threshold value will be a function of the characteristics of a particular type of lathe and can be provided to the microprocessor 126 via the input/output interface 130. Alternatively, it can be developed by the system with complimentary software which is discussed below. This software will allow the value to be adjusted to reflect wear of the lathe after prolonged use.

For the system 100, the comparison of the formatted signal 124 to the background noise threshold value is done individually for each segment; a decision as to how to qualify is made by a logic element 134 which assigns a PASS if the signal level is above the background threshold value. If not, then the logic element 134 assigns an indication of "FAIL" for the segment. An alternative approach is to calculate an average signal level a for all n segments within the interval T, and then compare this interval average a to the background noise threshold value. If this approach is taken, then all segments within the interval T are indicated as "pass" or "fail" on the basis of this comparison.

In either case, the resulting indicator is then provided to a signal converter 136 which provides a digital output that is suitable for entry in to an accumulator 138 which is a digital register. A counter 140 can be provided to track the segment that is being processed. This counter 140 is periodically initialized as 0, and the level of the counter 140 is monitored by an accumulator limiter 142 that sets limits on the accumulator 138 so that a stream of repeated "PASS" or "FAIL" indications will not saturate the accumulator 138 and make its content unresponsive when a stream of predominately the opposite type of indication occurs within a reasonable time period. This limiting is discussed below in greater detail in subsequent embodiments.

The accumulator 138 requires indications from a prescribed number of segments 124 before a determination can be made of whether the lathe 108 is actively cutting. A check as to whether the prescribed minimum number of segments have been analyzed can be made by a logic member 144, and if the value is less than the prescribed minimum, then the signal qualifying software 132 is provided with the next segment and the cycle is repeated. If not, then the accumulator content is evaluated by an accumulator evaluator 146 against a cutting standard 148. A logic element 150 then makes a comparison to the standard 148 and, if the content of the accumulator 138 is above, indicates "cutting" on report status 152 and when below, indicates "not cutting". At this point, independent of the outcome, the microprocessor 126 continues and, if a prescribed minimum number of segments is employed before evaluating the content of the accumulator 138, resets the segment count to 0 in the counter 140. When the segments 124 are qualified on a group basis, the counter 140 can count the number n of segments in the time interval T before the average a is calculated and used for the comparison. In any case, the standard 148 should be set such that a sufficient number of passed segments must be counted as to indicate active cutting for a significantly longer period of time than the typical time of duration of noise caused by advancing one of the tool bits 102 when the operator sets a desired depth of cut. This time is dependent, in part, on the rotational speed of the lathe, since the tool bit initially cuts into the disk surface when advanced, and cuts until such time as it has formed a continuous groove; at such time, the vibration caused by cutting dies off. Setting the standard 148 such that obtaining an indication that the lathe 108 is cutting requires a sufficient number of passed segments to form a time period that is longer than the time for such adjustment noise to occur helps to prevent false indications of cutting due to vibrations generated when setting the depth of cut.

The grouping of segments into time intervals is particularly advantageous in more sophisticated systems, such as discussed below, which provide more reliable screening to isolate high-amplitude noises. For such systems, the number n of segments that make up a time interval T can be selected to be generally greater than the typical duration of noise generated when an operator advances one of the tool bits to set an appropriate depth of cut, this time in turn depending, in part, on the rotational speed of the lathe. The length of the interval may also depend, in part, on the details of how the signals are subsequently processed.

Figure 2:
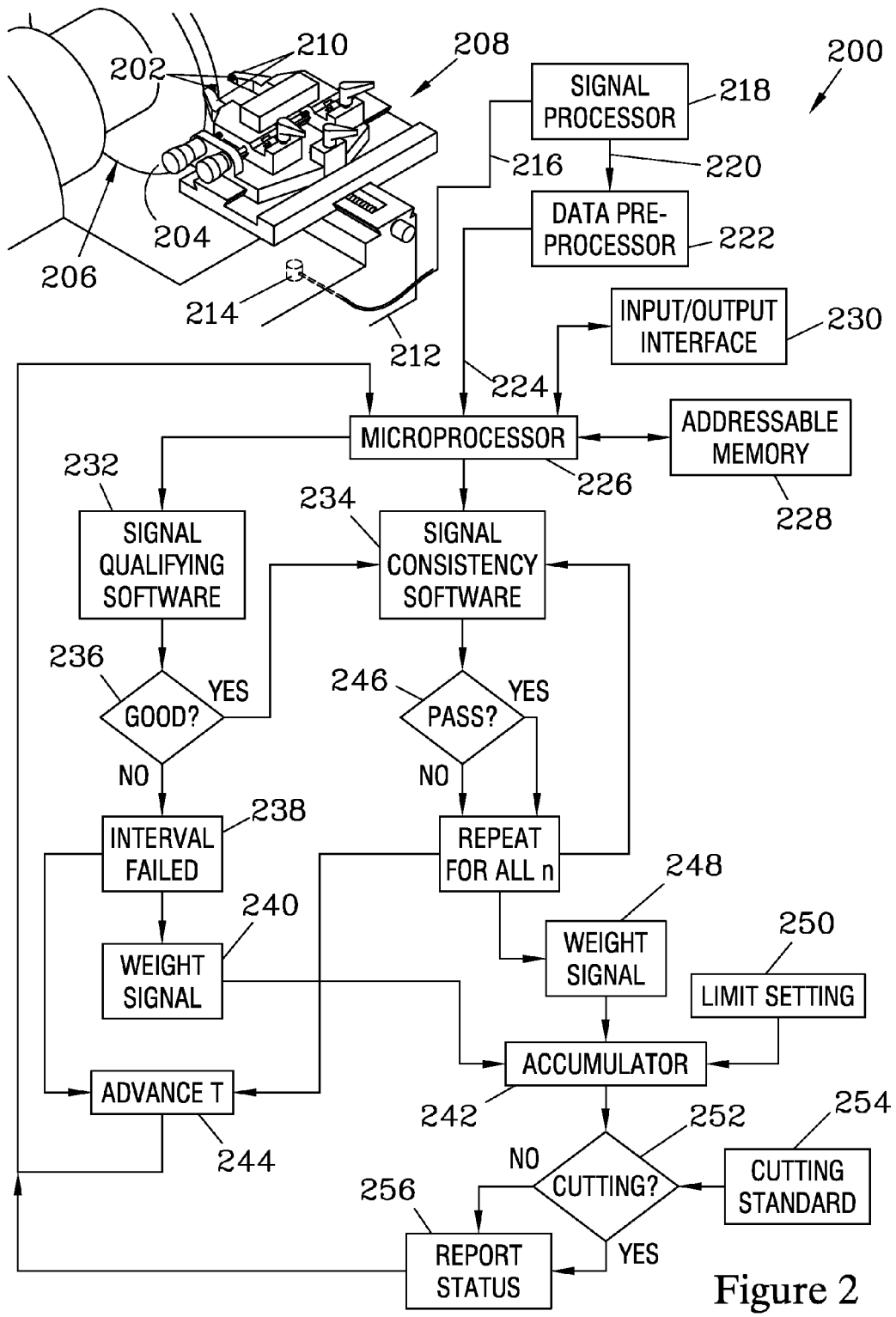
FIG. 2 is a schematic representation of another monitoring system. This system employs a two-stage evaluation of the signals generated by a vibration sensor. It first qualifies the signals by comparing the average signal over the interval against a background threshold value and, if the average is less than the background threshold level, the system treats all segments as failing. If not, then the segments are checked for consistency on an individual basis and appropriately reported. This system reports the state of cutting for a series of time intervals and compensates for environmentally-generated signals that could provide a false indication of cutting.

FIG. 2 is a schematic diagram of a system 200 for tracking the contact of tool bits 202 with pad-engaging disk surfaces 204 of a brake disk 206 to be resurfaced by a brake lathe 208. Again, the tool bits 202 are typically supported by tool bit arms 210 which in turn are adjustably mounted with respect to a frame 212 of the lathe 208. The system 200 differs from the system 100 illustrated in FIG. 1 in that the system 200 also provides the ability to exclude values that result from vibrations that are greater in magnitude than those likely to result from cutting, such as vibrations that may result from engagement of gears of the lathe or impacts to the lathe or the brake disk, or high-amplitude noise caused by environmental factors such as escaped compressed air from air tools used in the vicinity of the lathe 208.

The system 200 has a vibration sensor 214 which is coupled to the lathe 208. The vibration sensor 214 generates a vibration signal 216 that is responsive to the vibrations experienced by the frame 212, which in part are generated by the engagement of the tool bits 202 with the disk surfaces 204. A signal processor 218 processes the vibration signal 216 to provide an incremental time-averaged formatted signal 220 which in turn is operated on by a data pre-processor 222 to provide indexed time-averaged segments as discussed above with respect to the system 100. It should again be pointed out the signal processor 218 and the data pre-processor 222 can be a single unit. In any case, the result of processing the vibration signal 216 provides a series of formatted signal segments 224.

The system 200 employs a microprocessor 226 having an associated addressable memory 228, the microprocessor 226 providing instructions to the data pre-processor 222 according to settings provided through an input/output interface 230 to provide indexed time-averaged formatted signals for the current time interval T that are suitable to be stored in the addressable memory 228 by the microprocessor 226 and to be operated on by the remaining element of the system 200.

The formatted signal segments 224 that are stored in the memory 228 and, in this embodiment, are processed by signal qualifying software 232 (as is the case for the earlier embodiment) and also by signal consistency software 234 to see whether two conditions are met. This dual processing refines the analysis of the signal to better interpret it with respect to the vibrations being signals that indicate that active cutting of the brake disk surfaces 204 is being performed. The two conditions are that the signal level for the segments within the interval should indicate a sufficiently high amplitude as to be likely generated due to cutting noise, rather than continuous background noise, and that the signal level should be relatively constant throughout the interval, this second criterion allowing the system to discount those signals resulting from intermittent, high-intensity noise.

The first condition is checked by the signal qualifying software 232, which compares the signal levels for the segments within the interval against a predetermined background noise threshold value to determine whether the signal levels are above the threshold. While this comparison could be done individually for each segment (as discussed above with respect to FIG. 1 and below in the discussion of FIG. 3), the signal qualifying software 232 illustrated operates by calculating an average signal level a for all the segments within the interval and then comparing this interval average a to the background noise threshold value, as indicated in FIG. 2 by a signal qualifying check 236. If the interval average a is found to be sufficiently high, then the signal levels for each of the segments are further evaluated by the signal consistency software 234. If not, then the signal qualifying software 232 assigns an indication of "FAIL" to all segments within the time interval, as indicated by box 238. The "FAIL" indication is appropriately weighted by a qualifying software weighting routine 240, to reflect the number of segments within the interval, and converted to a format that is suitable for recording in an accumulator 242 for subsequent evaluation. The qualifying software weighting routine 240 also weights the indication in a manner appropriate for the particular operating scheme of the accumulator 242. If the accumulator is a register for storing integers then, as discussed in the descriptions of FIGS. 4 and 11, the "FAIL" indication for each segment may be weighted as a −1 value to be added to a value stored in the accumulator 242, resulting in a net weighted value of −n to be added for the interval, or may be weighted as zero, depending on the particular scheme of operation. In any case, once the interval has been indicated as failed, a time interval advancing routine 244 instructs the microprocessor 226 that it can repeat the process to evaluate a new time interval.

If the first condition for signal level is met, as determined by the signal qualifying software 232, then the segments 224 are evaluated individually by the signal consistency software 234. The signal consistency software 234 compares the signal level for the segment to a control range R that is based on the average signal level a for the entire time interval; this average a could be calculated by the signal qualifying software 232 or could be calculated by the signal consistency software 234 itself. The control range R has an upper limit value M that, in this embodiment, is defined by applying a scale factor S to the interval average a. This upper limit is provided to exclude vibrations of a magnitude so great as to be unlikely to have been generated by contact between the tool bits 202 and the disk 206, but which may raise the average a sufficiently high as to meet the first condition. The signal consistency software 234 also establishes a lower limit value m, which again is defined by applying a scaling factor s the interval average a. It should be noted that, while scaling the average a by a constant is employed in this system to determine the upper and lower limits of the control range R, alternative functions could be employed, and may be advantageous in expanding the width of the control range for noisier cuts, where the variation in signal level between different segments increases due to greater inconsistencies in the surface character of the brake disk.

When the signal level for the segment currently being analyzed resides within the range (M, m) a "PASS" indication for that segment is provided, while when the level falls outside the range (M, m), a "FAIL" indication is provided for the segment, this determination being indicated in FIG. 2 by a signal consistency check 246. Defining the upper limit value and the lower limit value based on a percentage of the interval average allows the signal consistency software 234 to accommodate variation in the signal level due to differences in the condition of the brake disk from one cutting operation to another, as well as the tendency of the signal level to gradually vary in intensity during a single cutting procedure. The upper limit M eliminates those signals from consideration where the vibration is higher than should be anticipated from the average. Such a value could result from accidentally striking the lathe with a tool or by engagement of gears of the lathe during alignment. The lower limit m assists in preventing segments from resulting in "PASS" indications in the event that one or more transient spikes are sufficient to raise the average for the interval above the threshold, in which case not including a lower limit might result in "FAIL" indications only for those segments where such spikes occur, while the remaining segments might pass since they are below the upper limit M. It should be noted that, if the upper limit M and the lower limit m are equally separated from the average a, the signal consistency check can simply check whether the absolute magnitude of the difference between the signal level for the current segment is less than the amount of this offset to simplify the check.

The comparison of the segment signal level value by the signal consistency software 234 is repeated for all remaining segments in the interval, and the resulting indications are weighted by a consistency software weighting routine 248 and converted to an integer format before being provided to the accumulator 242. As noted above, each "FAIL" indication will typically be weighted as either a −1 or zero to be added, depending on the operating scheme employed. A "PASS" indication is typically weighted as +1. After all segments in the interval have been checked for consistency, the time interval advancing routine 244 instructs the microprocessor 226 that it can process signal levels for a new time interval.

To prevent saturation of the accumulator 242, an accumulator limit setting routine 250 is provided, which acts to limit the content of the accumulator 242 so that additional values which would cause saturation are ignored. One approach is to reset the accumulator 242 after each time interval, as discussed in greater detail with regard to FIG. 11. Another approach is to make the addition or subtraction of values according to the weighted indications of the segments subject to upper and lower limits, so that additions that would raise the value stored in the accumulator 242 above the upper limit or subtractions which would reduce the value below the lower limit are ignored. This approach is discussed further with regard to FIG. 4.

An accumulator evaluator 252 evaluates the content of the accumulator 242 to make a determination of whether or not the lathe 208 is actively cutting the disk surfaces 204. This can be done by comparing the content of the accumulator 242 to a cutting standard 254 that has been provided via the input/output interface 230. Typically, if the content of the accumulator 242 meets or exceeds the cutting standard 254, then the lathe is considered to be actively cutting the disk surfaces, and if below, then it is considered to not be cutting. The appropriate indication of "CUTTING" or NOT CUTTING" is provided to a reporting routine 256, which can provide the indication to another system and/or to a display for a lathe operator, in either case providing the indication via the input/output interface 230.

The cutting standard 254 is typically selected such that a small number of time intervals T are required in which the majority of the segments are indicated as "PASS" before an indication that the lathe is cutting can be obtained. This helps to avoid false indications, such as might otherwise be caused by the noise generated when an operator advances one of the tool bits to set a desired depth of cut. Typically, the number n of segments within an interval T is set, relative to the duration of an individual segment, such that the duration of an entire interval is longer than the typical time of duration of noise caused by such advance of a tool bit. As noted above, this time is dependent, in part, on the rotational speed of the lathe, as the tool bit when advanced initially cuts into the disk surface until such time as it has cut a continuous groove, at which time the vibration caused by cutting dies off. Setting the duration of an interval longer than the time for such to occur, in combination with setting the cutting standard 254 sufficiently high that a number of intervals are required to obtain an indication that the lathe is cutting, serve to prevent false indications resulting from vibrations generated when setting the depth of cut.

Figure 3:
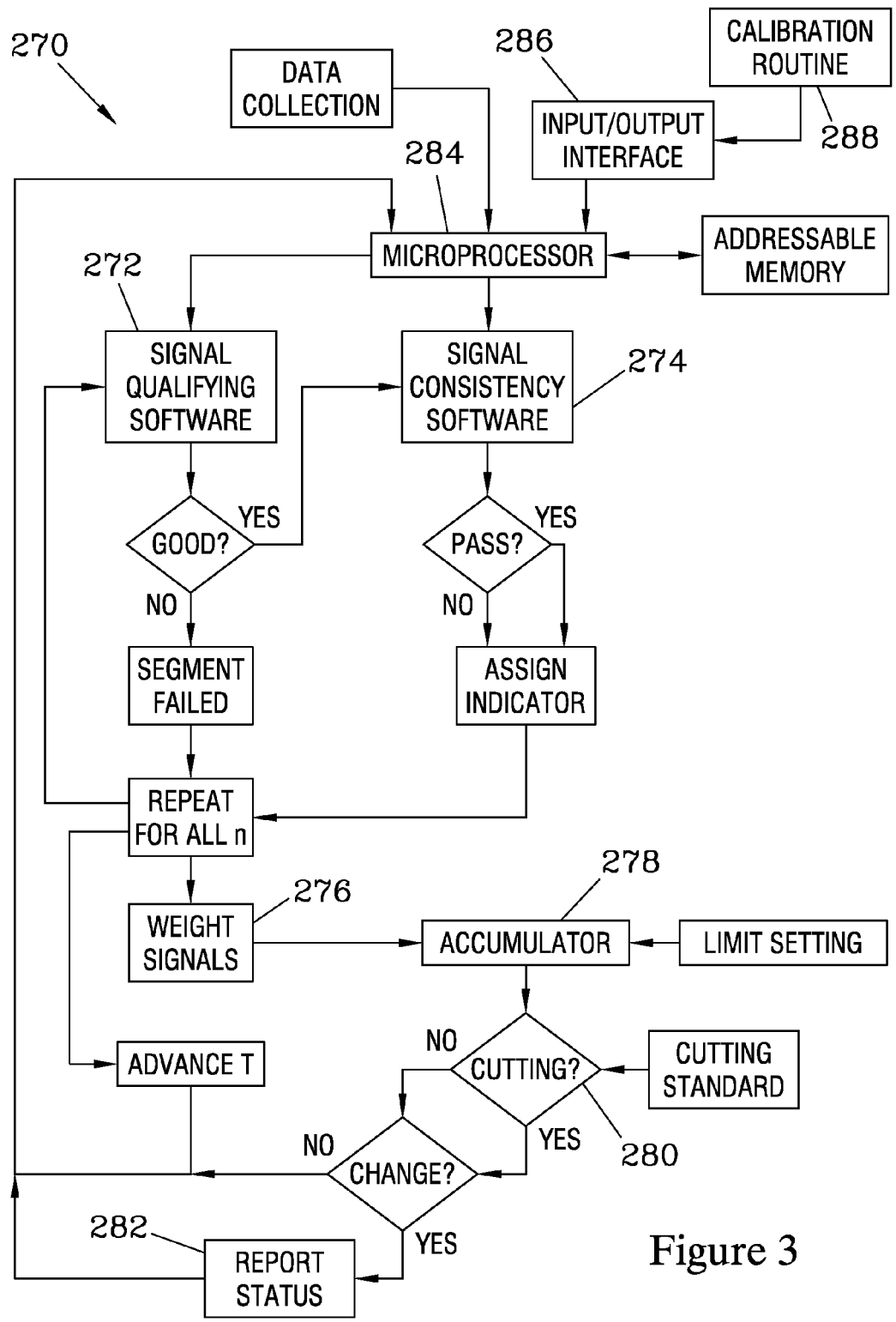
FIG. 3 is a schematic representation of another system that has many of the features of the system shown in FIG. 2, but which treats the signal for a time interval by checking individual segments to determine whether each has an average below or above the background noise threshold. This system also reports a change in status rather than the status of cutting.

FIG. 3 illustrates an alternative system 270 that has many features in common with the system 200 discussed above, but where signal qualifying software 272 makes an independent evaluation of the signal level for each segment, rather than evaluating the average signal level for all the segments within the interval currently being analyzed. In this scheme, each segment is first evaluated by the signal qualifying software 272 to determine whether it is above the background noise threshold value. If not, then a "FAIL" indication is assigned to that segment and the next segment in the interval is analyzed. If the signal level for the segment is above the threshold, then the segment is further analyzed by signal consistency software 274.

The signal consistency software 274 operates in a similar manner as the signal consistency software 234 discussed above, comparing the signal level to a control range that is based on a calculated average signal level a for all n segments within the time interval T currently being analyzed. However, the control range set by the signal consistency software 274 is only defined by an upper limit, since the effect of a lower limit may not be required due to the individual checking of the signal levels for the segments for sufficiently high level by the signal qualifying software 272. Those segments having signal levels below the upper limit are provided a "PASS" indication, while those falling above the upper limit are assigned a "FAIL" indication. Again, the analysis is repeated for all the segments within the time interval T. In this scheme, the next segment is analyzed first by the signal qualifying software 272 and, if not assigned a "FAIL" indication, is further analyzed by the signal consistency software 274.

As each of the segments within the interval T is analyzed, the indication for the segment is weighted by a weighting routine 276 and presented to an accumulator 278. An accumulator evaluator 280 evaluates the content of the accumulator 278 to determine whether or not the lathe is actively cutting the surfaces of the brake disk. In the system 270, a reporting routine 282 checks to see whether the state of the lathe as indicated by the accumulator evaluator 280 is different from the state previously indicated. If so, then a report of the change of state is made to a microprocessor 284 for presentation via an input/output interface 286. In this embodiment the input/output interface 286 also links a background noise calibration routine 288 to the microcomputer 284 so that the characteristics of the noise can be physically monitored when the lathe is running but without cutting occurring. This background noise calibration routine 288 allows the value for the ambient background noise threshold to be calibrated to reflect the change as a function of the wear that has occurred in the lathe. The vibration level monitored during this calibration period is scaled by an appropriate scaling factor Sf to obtain the background noise threshold value to be used for qualifying the signal; a scaling factor Sf of between about 1.2 and 1.5 has been found effective.

Figure 4:
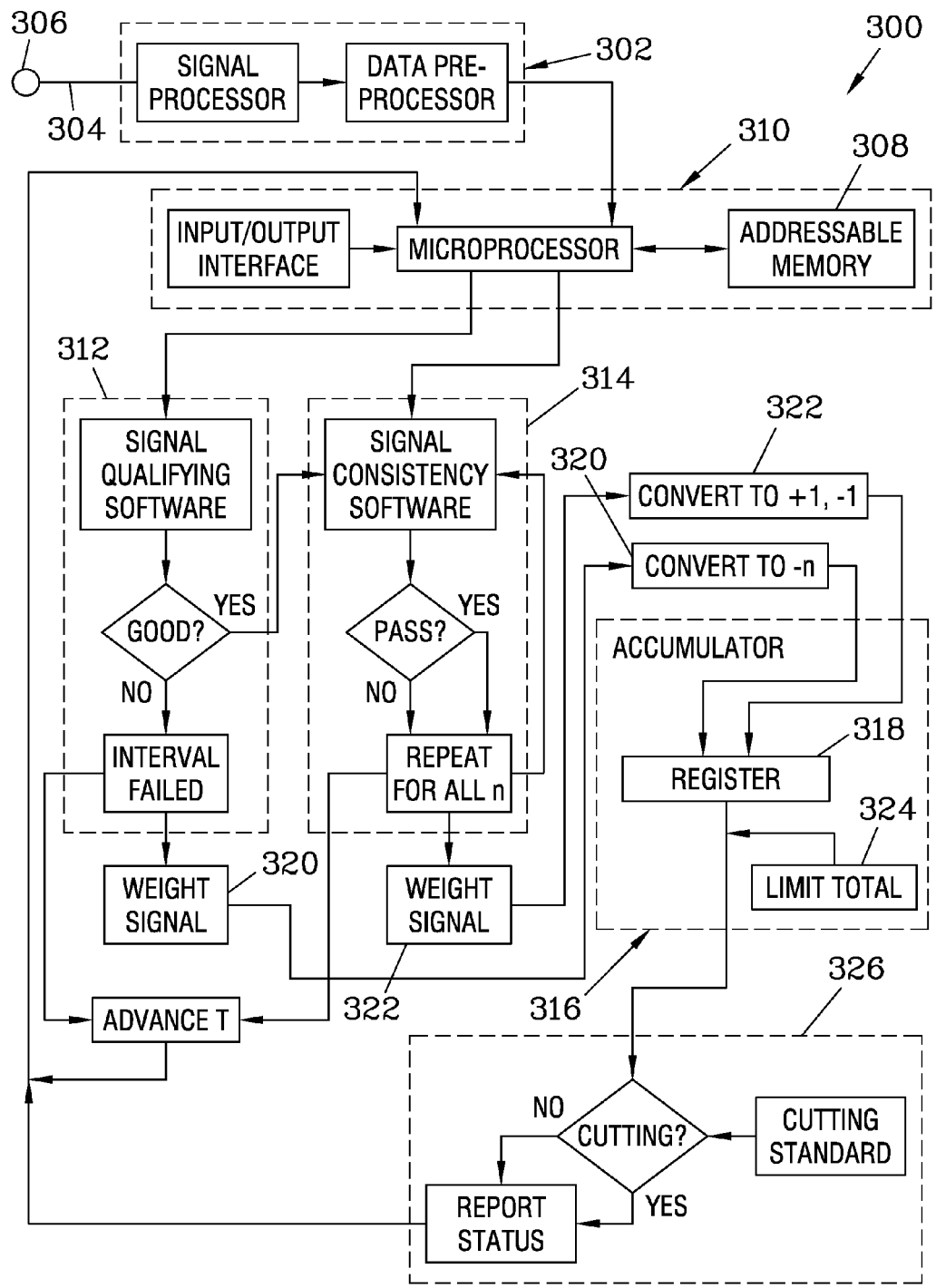
FIG. 4 is a schematic representation of a system that is similar to the system shown in FIG. 2, providing details on one type of accumulator which can be employed. This accumulator takes −1 and +1 as input values, subject to lower and upper caps on the resulting sum that is stored.

FIG. 4 is a schematic diagram that shows a monitoring system 300 which has many of the processing features of the system 200 shown in FIG. 2. It again has a group of signal processing components 302 that operate on a vibration signal 304 from a vibration sensor 306 for storage in an addressable memory 308 which is part of a microprocessor/communication interface assembly 310, with a microprocessor that drives a signal qualifying and checking routine 312 and a signal consistency and checking routine 314, as well as the interactions between the two routines (312, 314).

The system 300 has an accumulator 316 having a register 318 for storage of an integer value. The register 318 accepts values from a quality routine signal weight routine 320 and converts the failed signal from the signal qualifying and checking routine 312 to the value (−n). Similarly, the register 318 accepts values from a consistency routine signal weight routine 322 which converts each segment from the signal consistency and checking routine 314 indicating a pass to a (+1) and each indicating a fail to a (−1). After a weight signal has been set from either signal weight routine (320, 322) for all segments within the interval, the register 318 is checked by signal count limiter routine 324 and, if above or below a register limit range, the content of the register 318 is brought back to the limit beyond which it has passed. The content of the register 318 is then evaluated by an accumulator evaluator 326 to provide an indication as to whether or not active cutting has commenced or, if previously commenced, if it has subsequently ceased.

Figure 5:
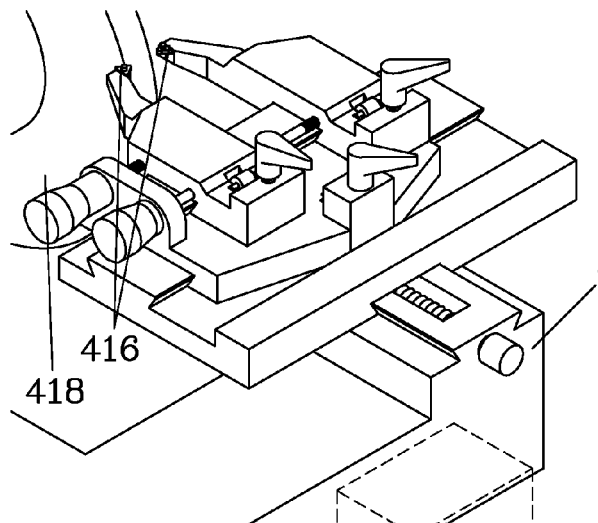
FIGS. 5-7 are isometric views showing details on one vibration sensor that can be employed by the system of the present invention to generate signals for processing. The vibration sensor employs a microphone that is mounted in a casing that attaches to a frame of an on-vehicle disk brake lathe.
Figure 6:
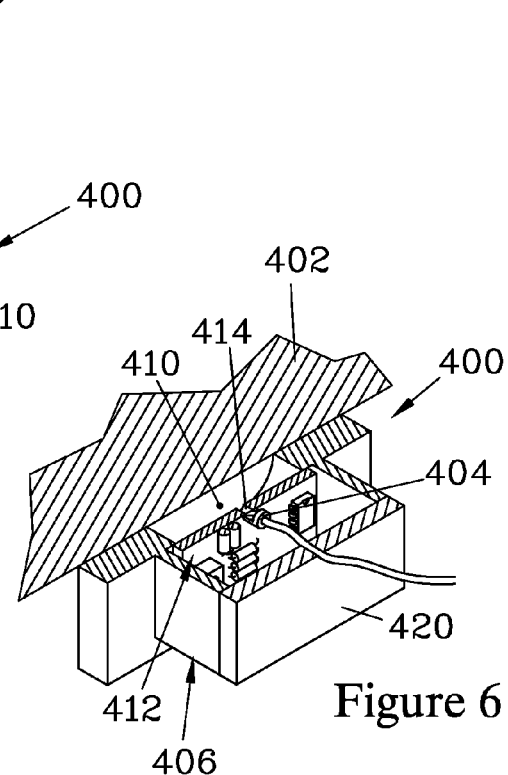
Figure 7:
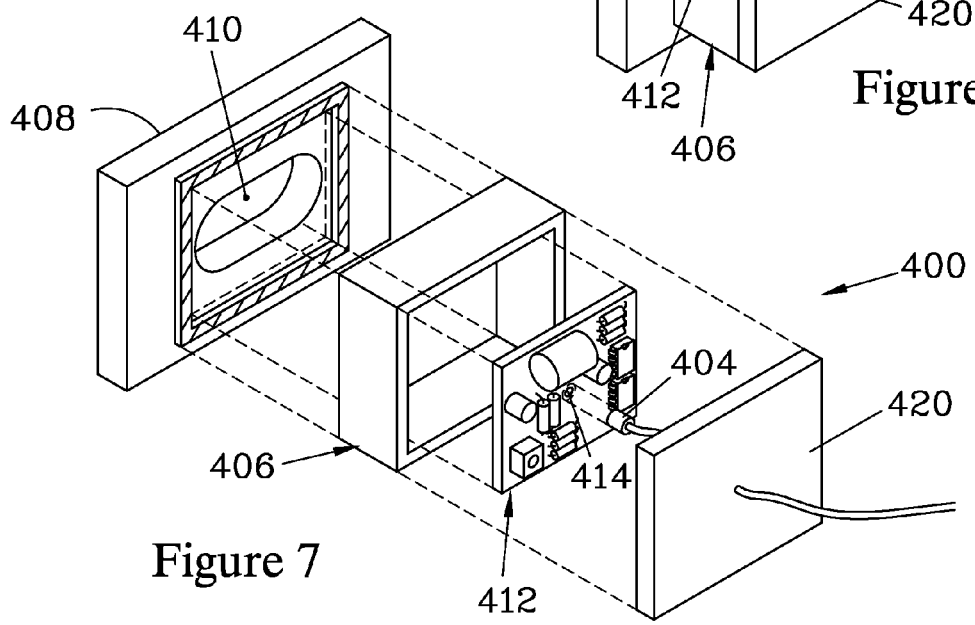

FIGS. 5 through 7 illustrate one example of a vibration sensor 400 which has been found to be very effective when incorporated into any of the above described systems to generate signals responsive to vibrations experienced by a lathe such as a lathe 402 illustrated. The vibration sensor 400 responds to vibrations transmitted through the structure of the lathe 402, and thus has reduced susceptibility to airborne noise.

The vibration sensor 400 employs a microphone 404 (shown in FIGS. 6 and 7) that is housed in a casing 406. The casing 406 has a mounting surface 408 with an open region 410. The mounting surface 408 is designed to mate against a portion of the lathe 402, and when so mated the open region 410 forms an enclosed chamber between the casing 406 and the lathe 402, as shown in FIG. 6.

The microphone 404 is mounted to a circuit board 412 having a port 414 (shown in FIGS. 6 and 7) therethrough. The port 414 communicates between the microphone 404 and the open region 410. Thus, vibrations from tool bits 416 caused by contact with a brake disk 418 are transmitted through the lathe 402 and cause vibrations in the air entrapped in the open region 410, and these vibrations are transmitted through the port 414 to the microphone 404. In effect, the microphone 404 acts as a non-directional accelerometer which monitors the vibrations of the surface of the lathe 402 to which it is attached.

The circuit board 412 and the microphone 404 are enclosed within the casing 406 by a casing cover 420, and when so encased, the microphone 404 is shielded from noise transmitted through the ambient air around the casing 406.

For a system employing a vibration sensor such as the sensor 400, it has been found effective for the scaling factors S and s employed to define the upper and lower limits of the control range R to be essentially constant. It has been found effective for S to be maintained between about 1.25 and 1.35, and for s to be maintained between about 0.65 and 0.75 when the interval length is in the range of about two seconds. It has also been found that, where the range of the signals is such that a very small average signal level a results under some cutting conditions, it is preferred to superimpose an additional offset that is in the neighborhood of 70-90% of a typical average for an especially quiet cut.

Also, when using a microphone as a vibration sensor and when the system has software to allow the average background noise level to be monitored in order to calibrate the background noise threshold value, it has been found effective to employ a scaling factor Sf of about 1.2 and 1.5 for setting such.

Example of Operation

To further illustrate the operation of a system such as the system 300 illustrated in FIG. 4, the following example of such a system in operation is presented.

Figure 8:
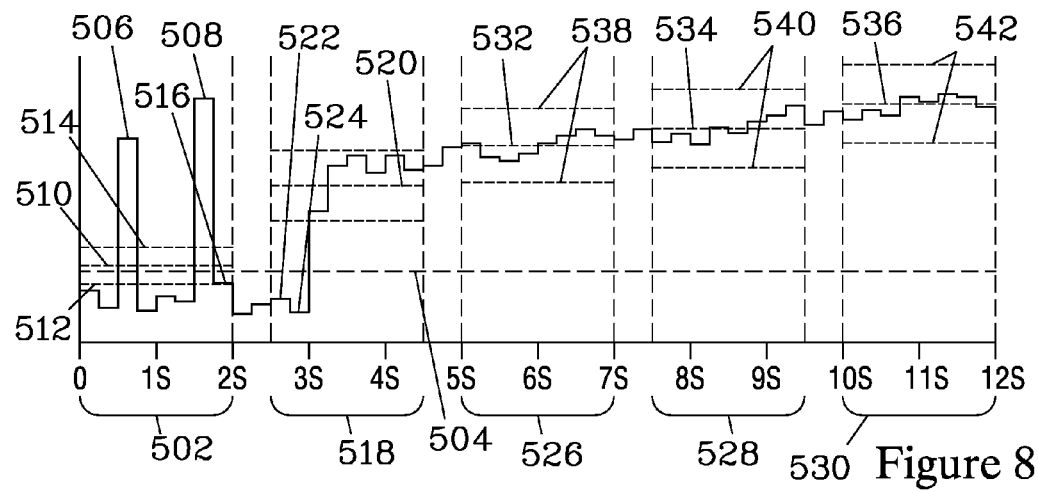
FIGS. 8-10 illustrate the character of the signal that can be generated and analyzed by a system such as illustrated in FIG. 4.
Figure 9:
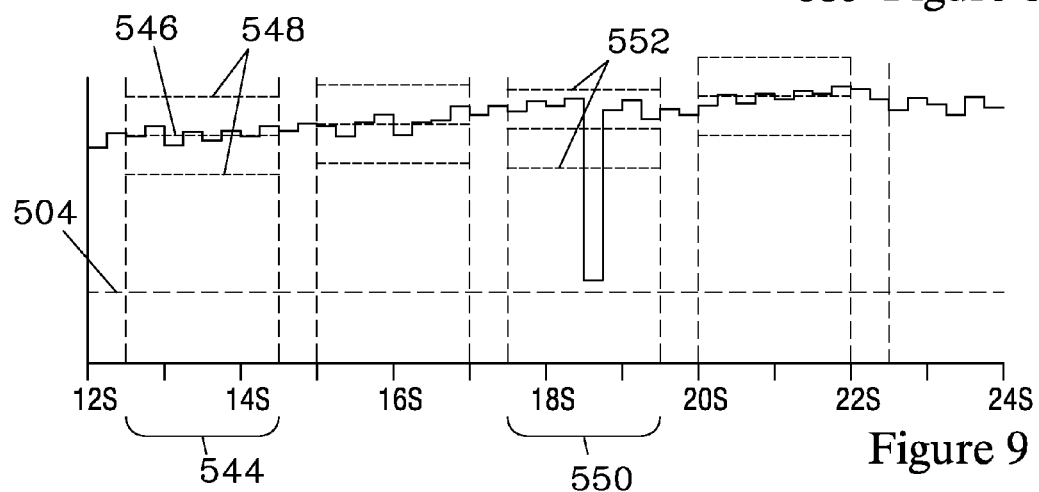
Figure 10:
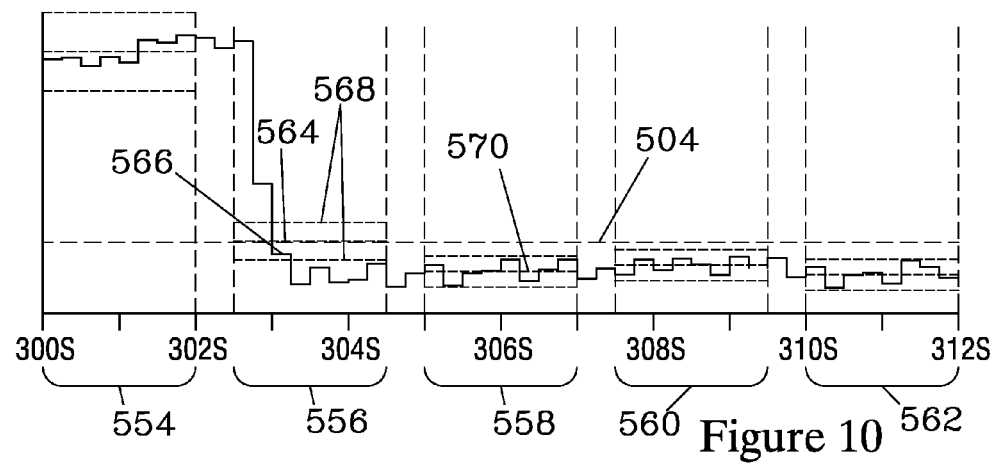

The system 300 having the accumulator 316 that converts the "PASS" and "FAIL" signals to +1 and −1 such as described above can be illustrated in use with the formatted signal levels as represented in FIGS. 8-10. For this example, each time interval T is selected to be two seconds in duration, and is subdivided into eight equal segments (n=8). This results in each segment having a duration of 0.25 seconds, which has experimentally been found to closely approximate the time for a high-amplitude noise event to occur, including time for the noise to die off, when the vibration sensor is a microphone housed in a casing such as illustrated in FIGS. 5 through 7 attached to the body of a lathe such as the Pro-Cut PFM® 9.2 model; it should be appreciated that the appropriate duration for each segment and of the entire interval may vary depending on the type of vibration sensor employed, its coupling to the lathe, and the configuration of the lathe itself. FIG. 8 labels the signal as starting at zero seconds, this point being set, for purposes of illustration, just before the lathe begins cutting.

As shown, a first time interval 502 occurs before the lathe begins active cutting of the disk surfaces, and hence the signal level for most of the segments is representative of the average background noise level (not shown), and thus should be well below a previously established index of background noise, a background noise threshold 504, which is set to be somewhat above the average level. Typically, the background noise threshold 504 is a predetermined value set based on the typical operating noise level for the particular model of lathe employed. However, to accommodate increased noise and vibration such as may occur as an individual lathe ages, the system can be designed to allow a qualified technician to calibrate the background noise threshold 504 at a time when the lathe is powered but is not actively engaged in cutting. One simple scheme for such calibration is to have the system monitor the vibration signal for an interval and calculate an interval average, in the same manner as is done when analyzing the signal, and then multiply this average by an appropriate scaling factor. To assure that the resulting background noise threshold is somewhat above the average level of noise, the scaling factor should be somewhat larger than unity; it has been found practical to set the scaling factor Sf at 1.2 in this example.

In the first interval 500, two segments (506, 508) show high-volume transient noises, such as might be caused by gear noise or impacts against the lathe or brake disk. The duration of the intervals and number of segments are selected such that each segment provides a representative indication of the perceived audible sound for that time period, with sufficient time for the vibrations from such high-intensity events to die off. In the illustrated example, these noises are sufficiently great as to raise an interval average 510 for the first interval 502 high enough that it is above the background noise threshold 504. Thus, when a signal qualifying routine (such as the signal qualifying and checking routine 312 schematically shown in FIG. 4) checks against the background noise threshold 504, there is no override and the signal levels for the first interval are further analyzed using a signal consistency routine (such as the signal consistency and checking routine 314 schematically shown in FIG. 4).

The signal consistency routine selects a control range that is based on the interval average 510, having a lower range limit 512 and an upper range limit 514, and then checks each segment to see whether the signal level for each segment is above the lower limit 512 but less than the upper limit 514. In an example using a Pro-Cut PFM® 9.2 lathe and a microphone mounted in a casing as a vibration sensor, it has been found effective to set upper and lower limits respectively at 130% and 70% of the average a, with an additional offset to accommodate variations in the signal level for very quiet cuts. For this example, this offset value can be set about 70-90% of the signal level for an extremely quiet cut. In the first interval 502 illustrated, only a last segment 516 is within the range. Thus, as each segment is analyzed by the signal consistency routine, the first seven segments each result in a "FAIL" indication, which is converted to a −1 value that is added to the register. However, the register limit routine ignores any additions that would cause the value in the register to fall below zero, and thus these values are essentially ignored. The value for the last segment 516, which does fall within the control range, results in a "PASS" indication that is converted to a +1 value to be added to the register. Thus, at the end of the first interval 502, the register contains a value of +1. It should be appreciated by one skilled in the art that, instead of being added sequentially as described above, the values for the segments could be summed prior to changing the value in the register; in the example above, the sum would be ((−7)+(+1))=(−6), which would result in a value of zero being stored in the register.

Once an accumulator evaluator has determined that there are no more segments within the current interval to be processed, the remainder of the routine provides a tracking function, tracking the progress of the cutting operation by comparing the register value to a cutting standard value. When the accumulator scheme shown in FIG. 4 is employed, the cutting standard value should be set to be a multiple of the number of segments in each interval. For purposes of illustration, the cutting standard value in this example is set to be 24 regardless of the currently-indicated state of the lathe. Thus, the comparison after the first interval 502 shows that the current value in the register (+1) is less than the cutting standard value, indicating that active cutting of the disk surfaces is not occurring. Since this state is already indicated, the indicated state of operation of the lathe remains unchanged, and an indication of the current state is provided. This indication can be provided to a lathe operator, such as via a visual display associated with the lathe, and/or to a system that records the machining operations of the lathe. Once the comparison of value in the register has been performed, the system repeats the analysis for the next interval.

A second interval 518 shown in FIG. 8 illustrates the vibration signal levels as the lathe is just starting to cut the disk surfaces. The interval qualification routine again determines an interval average value 520 to be above the background noise threshold 504, and thus the individual segments are evaluated by the isolation routine to determine whether or not they fall within a control range. It should be noted that the control range is determined on a percentage basis of the interval average value 520, with the optional addition of a small additional constant offset, and thus the control range for the second interval 518 is larger than that of the first interval 502, as the interval average 520 is greater. In the example illustrated, the first two segments (522, 524) fall outside the range, each resulting in a "FAIL" indication that is converted to a −1, while each subsequent segment is within the range, resulting in a "PASS" indication that is converted to a +1. If the values are added sequentially, the −1 for the first segment added to the +1 value previously in the register results in a stored value of zero, and the −1 for the second segment is ignored by the register limit routine. Each subsequent segment adds +1 to the register, and thus the register value is +6 after all segments have been added. The comparison performed by the accumulator evaluator shows that the register value (+6) is still below the cutting standard value (24), and thus no indication of cutting is provided, even though the lathe is actively cutting the disk surfaces at the time.

For the third, fourth, and fifth intervals (526, 528, and 530), the interval averages (532, 534, and 536, respectively) are each above the background noise threshold 504 and all segments fall within the control ranges (538, 540, and 542, respectively). For each of these intervals (526, 528, and 530), all segments result in a "PASS" indication that is converted to a +1 value to be added to the register. Thus, the register value is +14 after the third interval 526 has been analyzed, +22 after the fourth interval 528, and +30 after the fifth interval 530. Thus, it is not until after the fifth interval 530 that the comparison performed by the accumulator evaluator results in the register value being above the cutting standard value. At this time, the indicated state of the lathe is changed to indicate that the lathe is actively cutting. The time delay to achieve this status change helps prevent erroneous indications of cutting when the lathe cuts the disk surfaces for only a short time, such as typically occurs when the tool bits are moved to set the depth of cut, but are not translated across the disk surfaces.

Referring to FIG. 9, the sixth interval 544 again results in an interval average value 546 above the background noise threshold 504, and all segments falling within the control range 548. Thus, each segment results in a "PASS" indication that is converted to a +1 value to be added to the register. However, the register limit routine places an upper cap value on the register value, and ignores any additions that would result in the value being greater than the upper cap value. For this example, an upper cap value of 32 is employed, and thus the +1 values for the last six segments of the sixth interval are ignored. In fact, the values to be added continue to be ignored until such time as a "FAIL" indication is provided, such as occurs in the eighth interval 550. In this case, representing a drop in signal level when the tool bits encounter a notch in the disk surface, the segment where such occurs falls outside the control range 552. However, this −1 value is not sufficient to bring the value in the register below the cutting standard value. Ignoring the repeated addition of positive values by setting an upper cap prevents the register from becoming saturated and allows it to respond when the signal level drops at the completion of cutting, as occurs in the intervals shown in FIG. 10.

FIG. 10 shows the signal level when the machining of the disk surface is completed, including a final cutting interval 554 and first, second, third, and fourth post-cutting intervals (556, 558, 560, and 562, respectively). At the end of processing the signal levels for the final cutting interval 554, the register value is 32, since the additional +1 values for the segments of this and the preceding intervals have essentially been ignored.

For the first post-cutting interval 556, the signal level drops off when the cutting ceases, but the interval average 564 is still above the background noise threshold 504. However, only one segment 566 has a value that falls within control range 568, which is significantly smaller than the control range of the previous interval 554 as it is defined based, in part, on a percentage of the interval average 564. If the values converted from the "PASS" and "FAIL" indications for these segments are sequentially added, the register value falls to +26. This is still sufficiently high as to be above the cutting standard value, and thus the indicated state of the lathe remains unchanged, even though the lathe has stopped cutting by the end of this interval 556. Again, the delay in changing the indicated state helps avoid erroneous indications due to transient variations in the vibration level.

For the second post-cutting interval 558, the signal levels for the segments are so low that the interval average 570 is below the background noise threshold 504. In this case, the interval qualification routine overrides any check of the individual segments and simply provides a "FAIL" indication for all segments. These indications are converted to −1 values to be added to the register value (or a single addition of −8), and thus when the values for all segments in this interval have been added, the register value is +18. This is less than the cutting standard value (24), and thus the accumulator evaluator changes the indicated state of the lathe to indicate that it is no longer cutting. This indication remains through the remaining intervals, where again the interval average is so low that the indications for all segments within these intervals are overridden as "FAIL".

Figure 11:
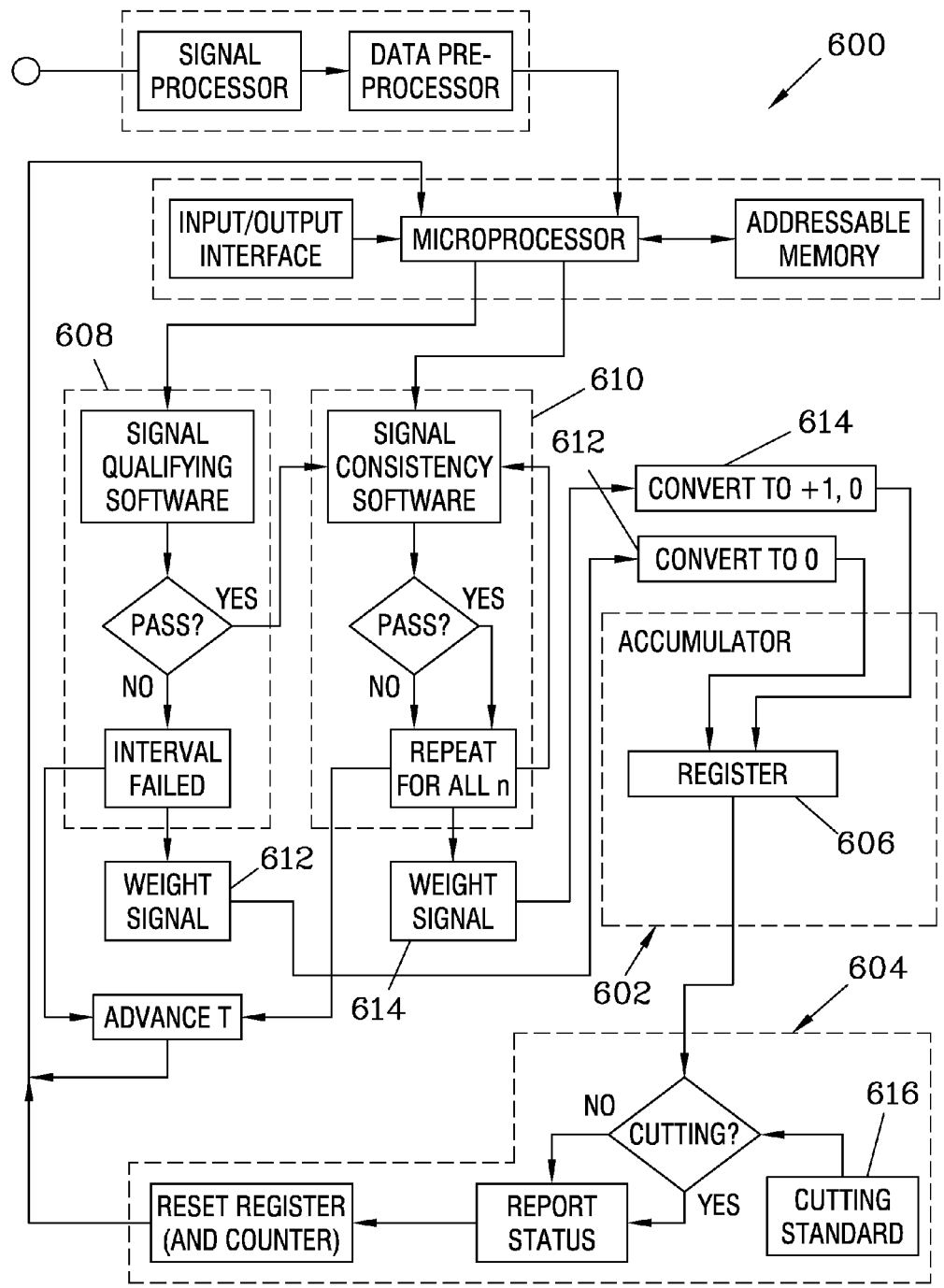
FIG. 11 is a schematic representation of a system which is similar to the system of FIG. 4, but which employs an accumulator which accepts 0 and +1 as input values, and which is reset after the signal for each time interval has been analyzed.

FIG. 11 illustrates the operation of a system 600 which employs many of the features of the system 300 shown in FIG. 4 but differs in the details of its accumulator 602 and its accumulator content evaluation and reporting routine 604. In the system 600, the formatted signal being analyzed is partitioned into longer intervals, each with a greater number of segments, and the system employs an accumulator 602 having a register 606 that is reset after each interval has been evaluated.

Again, a signal qualifying and checking routine 608 and a signal consistency and checking routine 610 evaluate the signal levels for the segments to determine, respectively, whether the average signal level for the interval is above a background noise threshold and, if so, whether the signal level for each of the segments is within a range determined based on the interval average. Again, the results of these determinations provide indications of "PASS" or "FAIL" that are weighted by signal weight routines (612, 614) and the weighted values provided to the accumulator 602.

In the system 600, if the signal qualifying and checking routine 608 makes a determination that the average signal level for the interval is not above the background noise threshold, then the weight routine 612 provides the accumulator 602 with a weighted value of zero. If the average signal level is sufficiently high, then the signal consistency and checking routine 610 evaluates the segments individually and the signal weight routine 614 weights each "PASS" indication as a +1 and each "FAIL" indication as a zero. When this scheme is employed, the intervals are typically partitioned so as to be longer, containing a greater number of segments to avoid erroneous indications of change in state. To accommodate the gradual change in average signal level typically experienced during the cutting procedure, the control range employed with such longer intervals should separated by a greater amount from the average than in the systems discussed above; when the range limits M and m are defined by scaling functions, such increase can be accomplished by increasing the value of the upper limit scaling factor S and decreasing the value of the lower limit scaling factor s.

Once weighted values for all the segments within the interval have been added to the register 606, the content of the register 606 is compared to a cutting standard value 616 by the accumulator content evaluation and reporting routine 604 to determine whether the state of the lathe should be indicated as "cutting" or "not cutting". After such analysis, the content of the register 606 is reset to zero before analyzing the next interval. In this manner, saturation of the accumulator 602 is avoided. In the event that it is not desired to employ longer intervals, so as to avoid having to employ an extremely wide control range to accommodate gradual changes in the average noise level during the cutting process, shorter intervals could be employed and the content of the register reset after a specified number of intervals have been analyzed.

Figure 12:
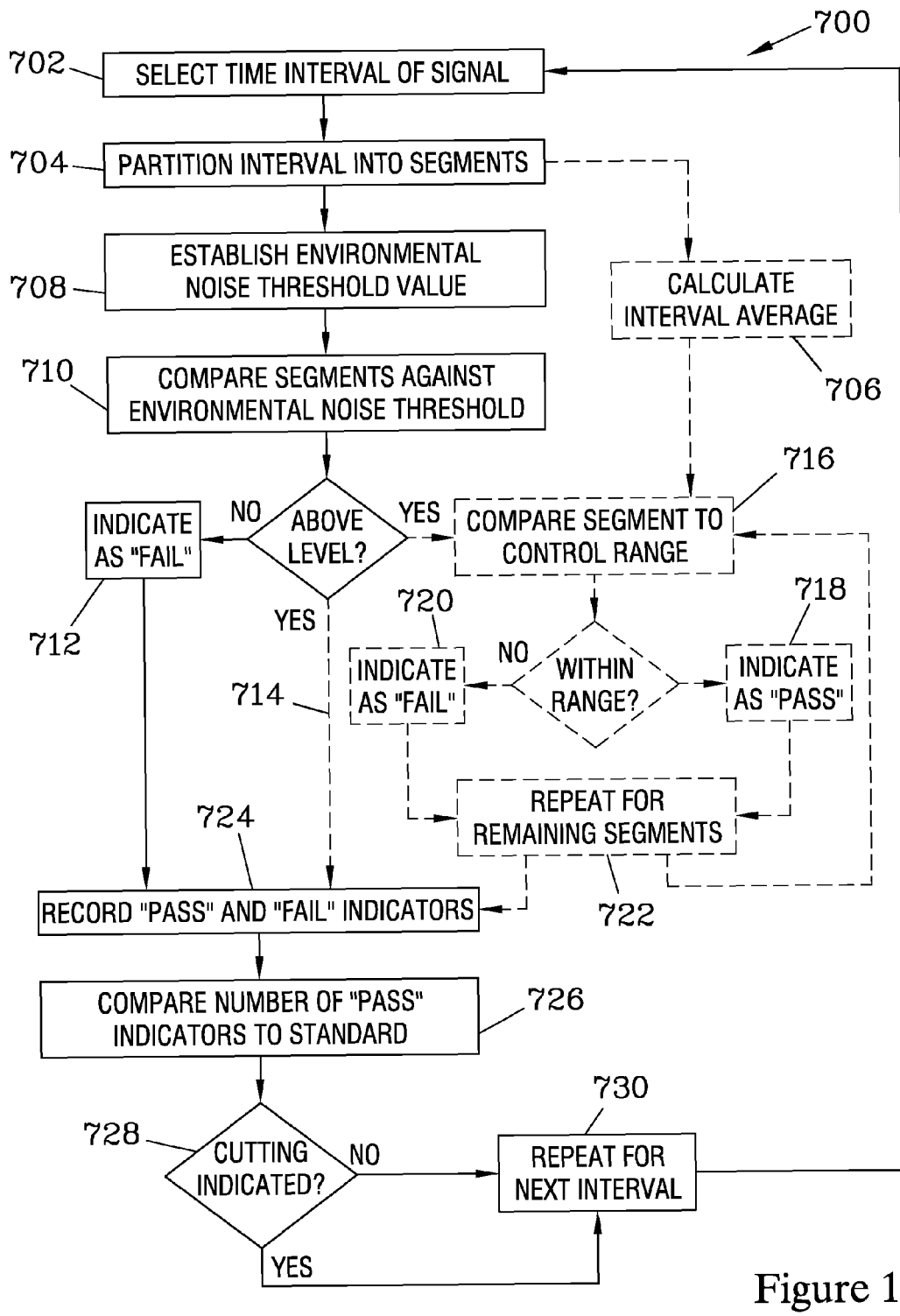
FIG. 12 is a flow diagram illustrating a method of the present invention for monitoring vibration sensors to evaluate whether a brake lathe is cutting the surfaces of a brake disk.

While the above described systems are provide for the monitoring the tool bits of an on-vehicle brake lathe and though this monitoring track the cutting progress of the lathe, the monitoring is not limited to the details of a particular system but rather can be practiced by a method such as illustrated in the flow chart of FIG. 12. This method monitors the contact between tool bits and a brake disk being machined by monitoring the vibrations being transmitted through the on-vehicle lathe.

The flow chart of FIG. 12 illustrates the steps of a method 700 for making a determination of whether time-dependent vibration signals generated by a brake lathe are indicative of the lathe actively cutting or not actively cutting a brake disk. The method 700 begins with the step 702 of selecting a subset of the vibration signals to define a time interval for evaluation. When the method 700 is designed to screen out high-amplitude noises, this time interval is typically selected to be between about one and four seconds to allow the method to accommodate short-period vibrations, such as those caused by a lathe operator advancing one of the tool bits to set a desired depth of cut, and thus depends, in part, on the configuration of the lathe employed. If the method 700 is not so sophisticated, and only analyzes the signal to determine whether the signal level is above that expected to result from environmental noise, the duration of the time interval can be selected for convenience in processing the signal. For each time interval to be analyzed, the data is collected as a series of n segments in step 704. Again, the number of segments is selected to set the duration time for each segment to an appropriate time for response to noises generated by the lathe, and depends, in part, on the lathe configuration. When the method 700 screens for high-amplitude noises, an average signal level value for all the segments in the time interval is calculated in step 706.

A background noise threshold value is established in step 708. The background noise threshold value should be selected to be somewhat above the average level of constant noise experienced when the lathe is operating but not cutting; typically, this is predominantly motor noise from the lathe, and thus should be relatively constant for a particular type of lathe. Thus, a constant value for the background noise threshold can be established for a particular lathe type. However, since the lathe noise may increase with wear, it may be desirable to allow a qualified technician to recalibrate this value based on actual vibration levels experienced, in which case the background noise threshold is set at a value somewhat above the average measured vibration level.

The signal level for the segments is compared against the threshold value for background noise in step 710. Such comparison could be done individually for each segment, or could be done by comparing the average value calculated in step 706. In either case, a "FAIL" indication is provided in step 712 for those segments where the signal level is not above the background noise threshold value; in the case where the average for the entire time interval is compared, the "FAIL" indication is provided for all segments within the interval.

Those segments for which the signal level is found to be above the background noise threshold value in step 710 can be simply treated as a "PASS", as indicated by the arrow 714. Alternatively, as illustrated in FIG. 12, these segments can be analyzed further to compensate for incidental noise bursts, as indicated in step 716. If such is done, then the time-averaged signal level for an individual segment is compared to a control range R that brackets the average signal level for the time interval that was calculated in step 706. Appropriate limits for the control range R are discussed above with regard to the system of the present invention. The width of the control range R can be determined by a value that scales with the average signal level for the interval, or by a combination of such a value and a set offset value, the set offset value providing a minimum separation width to accommodate variations in signal levels from segment to segment under conditions where the average signal level for the interval is extremely low, such as when the lathe is making a very light, quiet cut. If a combination is employed, the set value is selected and applied in such manner that it becomes irrelevant as the average signal level increases. If the signal level for a particular segment falls within the control range, the "PASS" indication from the comparison in step 710 is maintained in step 718. Otherwise, a "FAIL" indication for that segment is provided in step 720. This comparison is then repeated for all remaining segments, as indicated by step 722.

When an indication has been provided for all the segments, either in step 710 or in step 716, the "PASS" and "FAIL" indications are cumulatively recorded in step 724. The resulting sum is compared to a prescribed standard in step 726 to evaluate whether or not the cumulative indications meet the standard for indicating that cutting should be indicated. This comparison provides an indication in step 728 of whether the lathe is "cutting", as indicated by the cumulative indications meeting the standard, or "not cutting", if the cumulative indications obtained in step 724 do not meet the standard. In either case, the method continues by repeating the above steps for the next time interval, as indicated by step 730. The prescribed standard employed in step 726 should be selected such that a sufficient number of "PASS" indications must be cumulatively added as to correspond to active cutting occurring for a significantly longer period of time than the typical time of duration of noise caused by advancing one of the tool bits when the operator of the lathe sets a desired depth of cut. As noted above when discussing the system, this time is partly dependent on the rotational speed of the lathe.

While the novel features of the present invention have been described in terms of particular embodiments and preferred applications, it should be appreciated by one skilled in the art that substitution of materials and modification of details can be made without departing from the spirit of the invention.

What is claimed is:

1. A monitoring system for tracking the contact of tool bits of an on-vehicle brake lathe with surfaces of a brake disk during the turning operation, the brake lathe having a frame, the monitoring system comprising: a microphone which serves as a vibration sensor coupled to the lathe for generating a signal responsive to vibrations that the lathe experiences; a casing having a port therein, said casing attaching to the lathe frame via a mounting surface having an open region therein which forms a chamber when attached to the lathe frame, said microphone being enclosed in said casing and positioned with respect to said port such that said port communicates between said chamber and said microphone; a microprocessor; an addressable memory which communicates with said microprocessor; a microprocessor interface for inputting parameters relating to the operation of the system and for outputting indications as to whether or not the lathe is actively cutting the disk surfaces; a data collection and partitioning module which operates on the signals for a selected time interval T, said data collection and partitioning module operating under the control of said microprocessor and collecting, partitioning, and formatting the signals to provide time-averaged indexed segments suitable for said microprocessor to provide to said addressable memory, the duration of each segment being selected to be consistent with the time of decay of an impact load experienced by the lathe, wherein said data collection and partitioning module groups the segments into time intervals T each consisting of n segments, where n is selected such that the duration of the resulting time interval T is generally greater than the duration of noise caused by advancing a tool bit of the lathe to set a desired depth of cut; a signal qualifying routine for qualifying the segments to compare the signal levels for the segments to a background noise threshold value to determine whether the signal levels are above the background noise threshold value and indicating as "fail" those segments for which the signal level is not above the background noise threshold value, and otherwise indicating as "pass"; a signal consistency routine for analyzing those n incremental segments of a selected time interval T which have been indicated as passing by said signal qualifying routine, said signal consistency routine establishing a control range limited by a range upper limit M that is offset above an average signal level a calculated for the selected time interval T and thereafter comparing the signal level for each of the n segments to the control range to see whether the signal level falls within the control range and operating to retain the indication of "pass" for those segments where the signal level falls within the control range and to change the indication to "fail" for those segments where the signal level falls outside; a digital register that serves as an accumulator; a converter for weighting indications received from said signal consistency routine and presenting weighted signals for the "pass" and "fail" indications to an said accumulator in an acceptable format, wherein said weighting function converts the "pass" and "fail" indications to digital values for storage in said accumulator; and an accumulator evaluator that analyzes the content of said accumulator to make an evaluation of the cutting state of the lathe, said accumulator evaluator being configured such that at least a prescribed number of "pass" signals are required to provide an indication of cutting, wherein said accumulator evaluator compares the value stored in said accumulator to a prescribed cutting standard value and, if reached, provides a cut signal.

2. The monitoring system of claim 1 wherein the control range is further defined by a range lower limit m that is offset below the average signal level a.

3. A monitoring system for tracking the contact of tool bits of an on-vehicle brake lathe with surfaces of a brake disk during the turning operation, the monitoring system comprising: a vibration sensor coupled to the lathe for generating a signal responsive to vibrations that the lathe experiences; a microprocessor; an addressable memory which communicates with said microprocessor; a microprocessor interface for inputting parameters relating to the operation of the system and for outputting indications as to whether or not the lathe is actively cutting the disk surfaces; a data collection and partitioning module which operates on the signals for a selected time interval T, said data collection and partitioning module operating under the control of said microprocessor and collecting, partitioning, and formatting the signals to provide time-averaged indexed segments suitable for said microprocessor to provide to said addressable memory, the duration of each segment being selected to be consistent with the time of decay of an impact load experienced by the lathe; wherein said data collection and partitioning module groups the segments into time intervals T each consisting of n segments, where n is selected such that the duration of the resulting time interval T is generally greater than the duration of noise caused by advancing a tool bit of the lathe to set a desired depth of cut; a signal qualifying routine for qualifying the segments to compare the signal levels for the segments to a background noise threshold value to determine whether the signal levels are above the background noise threshold value and indicating as "fail" those segments for which the signal level is not above the background noise threshold value, and otherwise indicating as "pass"; a signal consistency routine for analyzing those n incremental segments of a selected time interval T which have been indicated as passing by said signal qualifying routine, said signal consistency routine establishing a control range limited by a range upper limit M that is offset above an average signal level a calculated for the selected time interval T and thereafter comparing the signal level for each of the n segments to the control range to see whether the signal level falls within the control range and operating to retain the indication of "pass" for those segments where the signal level falls within the control range and to change the indication to "fail" for those segments where the signal level falls outside; a digital register that serves as an accumulator; a converter for weighting indications received from said signal consistency routine and presenting weighted signals for the "pass" and "fail" indications to said accumulator in an acceptable format, wherein said weighting function converts the "pass" and "fail" indications to digital values for storage in said accumulator; and an accumulator evaluator that analyzes the content of said accumulator to make an evaluation of the cutting state of the lathe, said accumulator evaluator being configured such that at least a prescribed number of "pass" signals are required to provide an indication of cutting; wherein said accumulator evaluator compares the value stored in said accumulator to a prescribed cutting standard value and, if reached, provides a cut signal.

4. The monitoring system of claim 3 wherein the control range is further defined by a range lower limit m that is offset below the average signal level a.

5. The monitoring system of claim 4 wherein, when said signal qualifying routine qualifies the segments as a group within the interval T to which they belong, said signal qualifying routine comparing the average signal level a for the time interval T to the background noise threshold and, if it finds that the average a is less than the background noise threshold, all n segments are indicated as failing.

6. The monitoring system of claim 5 wherein said signal consistency routine operates to set the range upper limit M such that the range upper limit M is defined by S(a) where S is an upper limit scaling function constrained such that the value of S(a) does not to exceed 1.35*a and does not fall below 1.25*a, and further wherein said signal consistency routine operates to set a range lower limit m of the control range, the range lower limit m being defined by s(a) where s is a lower limit scaling function constrained such that the value of s(a) does not to fall below 0.65*a or exceed 0.75*a.

7. The monitoring system of claim 6 wherein the range upper limit M and the range lower limit m are each further offset from the average signal level a by an offset amount δ which is at least about 70% and no more than about 90% of the typical average signal level for an especially quiet cut.

8. The monitoring system of claim 4 wherein said signal consistency routine operates to set the range upper limit M such that the range upper limit M is defined by S(a) where S is an upper limit scaling function constrained such that the value of S(a) does not to exceed 1.35*a and does not fall below 1.25*a, and further wherein said signal consistency routine operates to set a range lower limit m of the control range, the range lower limit m being defined by s(a) where s is a lower limit scaling function constrained such that the value of s(a) does not to fall below 0.65*a or exceed 0.75*a.

9. The monitoring system of claim 8 wherein the range upper limit M and the range lower limit m are each further offset from the average signal level a by an offset amount δ which is at least about 70% and no more than about 90% of the typical average signal level for an especially quiet cut.

10. The tool bit monitoring system of claim 9 wherein said accumulator evaluator operates to compare the content of said accumulator to predefined upper and lower cutting indication limits, wherein the predefined upper cutting indication limit is set such that it can be reached only after a predetermined number of intervals, said accumulator evaluator reporting, an indication of "cutting" if the content of said accumulator is greater than the upper cutting indication limit, and an indication of "not cutting" if the content of said accumulator is less than the lower cutting indication limit.

11. The tool bit monitoring system of claim 10 wherein the digital values provided by said weighting routine are integer values set to be: +1 for each segment indicated as passed, and −1 for each segment indicated as failed, and further wherein an upper cap and a lower cap are set on the content of said accumulator to maintain responsiveness.

12. A method for monitoring a lathe when operating in a noisy environment to make a determination of whether time-dependent vibration signals generated by a sensor coupled to the lathe are indicative of the lathe actively cutting or not actively cutting a brake disk, the method comprising the steps of: processing the vibration signals into indexed time-averaged segments falling within a time interval; establishing a threshold value for the environmental noise; comparing the signal level for the segments against the threshold value of the environment noise and providing a "fail" indication when the signal level is not above the threshold value and otherwise providing a "pass" indication; calculating an average signal level a for all the segments in the time interval; establishing a control range that includes at least a range upper limit M that is offset above the calculated average signal level a; comparing the signal level for each of the segments to the control range to see whether the signal level falls within the control range, and retaining the indication of "pass" for those segments where the signal level falls within the control range and changing the indication to "fail" for those segments where the signal level falls outside the control range; cumulatively recording the "pass" and "fail" indications after said step of comparing the signal level to the control range; and evaluating the cumulative "pass" and "fail" indications by comparing against a prescribed standard.

13. The method of claim 12 for use with lathes that are subject to experiencing high-amplitude noise bursts wherein the range upper limit M is provided by applying a scaling factor S to the average signal level a so as to provide a control range R that excludes the noise bursts.

14. The method of claim 13 wherein the scaling function of the average signal level a that determines the separation of the control range R is subject to adjustment so as to establish a minimum offset.

15. The method of claim 14 wherein said step of comparing the signal level for the segments against the threshold value of the environment noise further comprises:

calculating an average signal level for all the segments in the interval;

comparing the resulting average signal level to the threshold value of the environment noise; and if the average signal level is not above the threshold value, providing a "fail" indication for all segments within the interval and if the average signal level is above the threshold value, providing a "pass" indication for all segments within the interval.

16. The monitoring system of claim 2 wherein, when said signal qualifying routine qualifies the segments as a group within the interval T to which they belong, said signal qualifying routine comparing the average signal level a for the time interval T to the background noise threshold and, if it finds that the average a is less than the background noise threshold, all n segments are indicated as failing.

17. The monitoring system of claim 16 wherein said signal consistency routine operates to set the range upper limit M such that the range upper limit M is defined by S(a) where S is an upper limit scaling function constrained such that the value of S(a) does not to exceed 1.35*a and does not fall below 1.25*a, and further wherein said signal consistency routine operates to set a range lower limit m of the control range, the range lower limit m being defined by s(a) where s is a lower limit scaling function constrained such that the value of s(a) does not to fall below 0.65*a or exceed 0.75*a.

18. The monitoring system of claim 17 wherein the range upper limit M and the range lower limit m are each further offset from the average signal level a by an offset amount δ which is at least about 70% and no more than about 90% of the typical average signal level for an especially quiet cut.

19. The monitoring system of claim 2 wherein said signal consistency routine operates to set the range upper limit M such that the range upper limit M is defined by S(a) where S is an upper limit scaling function constrained such that the value of S(a) does not to exceed 1.35*a and does not fall below 1.25*a, and further wherein said signal consistency routine operates to set a range lower limit m of the control range, the range lower limit m being defined by s(a) where s is a lower limit scaling function constrained such that the value of s(a) does not to fall below 0.65*a or exceed 0.75*a.

20. The monitoring system of claim 19 wherein the range upper limit M and the range lower limit m are each further offset from the average signal level a by an offset amount $\delta$ which is at least about 70% and no more than about 90% of the typical average signal level for an especially quiet cut.

21. The tool bit monitoring system of claim 20 wherein said accumulator evaluator operates to compare the content of said accumulator to predefined upper and lower cutting indication limits, wherein the predefined upper cutting indication limit is set such that it can be reached only after a predetermined number of intervals, said accumulator evaluator reporting, an indication of "cutting" if the content of said accumulator is greater than the upper cutting indication limit, and an indication of "not cutting" if the content of said accumulator is less than the lower cutting indication limit.

22. The tool bit monitoring system of claim 19 wherein the digital values provided by said weighting routine are integer values set to be: +1 for each segment indicated as passed, and −1 for each segment indicated as failed, and further wherein an upper cap and a lower cap are set on the content of said accumulator to maintain responsiveness.

* * * * *